United States Patent [19]

Hackney, III

[11] 4,140,327
[45] Feb. 20, 1979

[54] TRUCK BODY BAY DOORWAY PLATFORM

[75] Inventor: James A. Hackney, III, Washington, N.C.

[73] Assignee: Hackney & Sons, Inc., Washington, N.C.

[21] Appl. No.: 866,405

[22] Filed: Dec. 30, 1977

[51] Int. Cl.² ............................................. B60R 3/02
[52] U.S. Cl. .................................... 280/163; 280/166
[58] Field of Search ...................... 280/163, 166, 164; 182/92, 90; 108/134, 135; 248/235, 239

[56] References Cited

U.S. PATENT DOCUMENTS

| 3,357,719 | 12/1967 | McCrea | 280/163 |
| 3,796,456 | 3/1974 | Bergeson | 280/163 |
| 4,029,355 | 6/1977 | Wilhelmsen | 280/166 |

Primary Examiner—Robert R. Song
Attorney, Agent, or Firm—Clarence A. O'Brien; Harvey B. Jacobson

[57] ABSTRACT

A generally horizontal platform is provided for removable support from the side of a truck body having a bay doorway therein and defining opposing upstanding door receiving channels extending along opposite sides of the doorway and a lower horizontal sill structure extending between the lower ends of the opposite side marginal portions of the doorway. The platform includes a horizontal panel structure including opposite side marginal edge portions and opposite inner and outer marginal edge portions extending between the opposite side marginal edge portions. The platform further includes oppositely endwise outwardly directed stub axle portions supported therefrom and projecting outwardly from the ends of the side marginal edge portions adjacent the inner marginal edge portion. The stub shaft portions are slidingly and rotatingly receivable in the aforementioned channels and the platform also includes a pair of braces dependingly supported from the side marginal edge portions of the panel and including upstanding abutment surfaces facing outwardly the inner side marginal portion of the panel for abutting engagement with the outer surface of the sill. The braces are hingedly supported from the panel for inward and upward swinging movement toward retracted positions general paralleling and immediately underlying the panel.

7 Claims, 4 Drawing Figures

TRUCK BODY BAY DOORWAY PLATFORM

BACKGROUND OF THE INVENTION

The platform of the instant invention is designed to assist the driver of a bay door equipped truck in unloading items through the bay door of the truck.

Drivers of bay door equipped trucks presently are incumbered when unloading through the bay door inasmuch as they have to stand on the outside of the bay and support themselves with one hand while grasping and unloading an item from the top of a stack of items within the bay with the other hand.

Although various forms of vehicle steps and platforms have been heretofore provided, such as those disclosed in U.S. Pat. Nos. 1,932,327, 2,378,678, 2,820,667, 3,357,719, 3,796,456 and 3,858,905, these previously known forms of steps and platforms are not specifically adapted for use in facilitating the unloading and loading of a bay door equipped door body.

BRIEF DESCRIPTION OF THE INVENTION

The platform of the instant invention is constructed in a manner whereby it may be readily removably supported from the vertical channels at the opposite sides of a truck body bay door and braced from the lower sill extending between the lower ends of the opposite sides of the doorway. The platform is further constructed in a manner whereby it may be readily folded for compact storage. In addition, the platform is constructed whereby it may be readily transferred from one bay door opening to an adjacent bay door opening without folding or unfolding the platform and the simplistic structure of the platform enables it to support loads up to 1,000 lbs. safely and without requiring reinforcement of associated portions of the truck body.

The main object of this invention is to provide a platform for use in supporting persons immediately outwardly of the bay door of a truck body and in substantial horizontal registry with the floor of the bay of the truck body.

A still further object of this invention is to provide a platform which may be readily transferred from one bay door opening to an adjacent bay door opening.

Another object of this invention is to provide a platform which may be readily folded into a compact state for storage.

A further important object of this invention is to provide a platform which will be capable of supporting heavy loads up to 1,000 lbs.

A final object of this invention to be specifically enumerated herein is to provide a truck body bay doorway platform in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
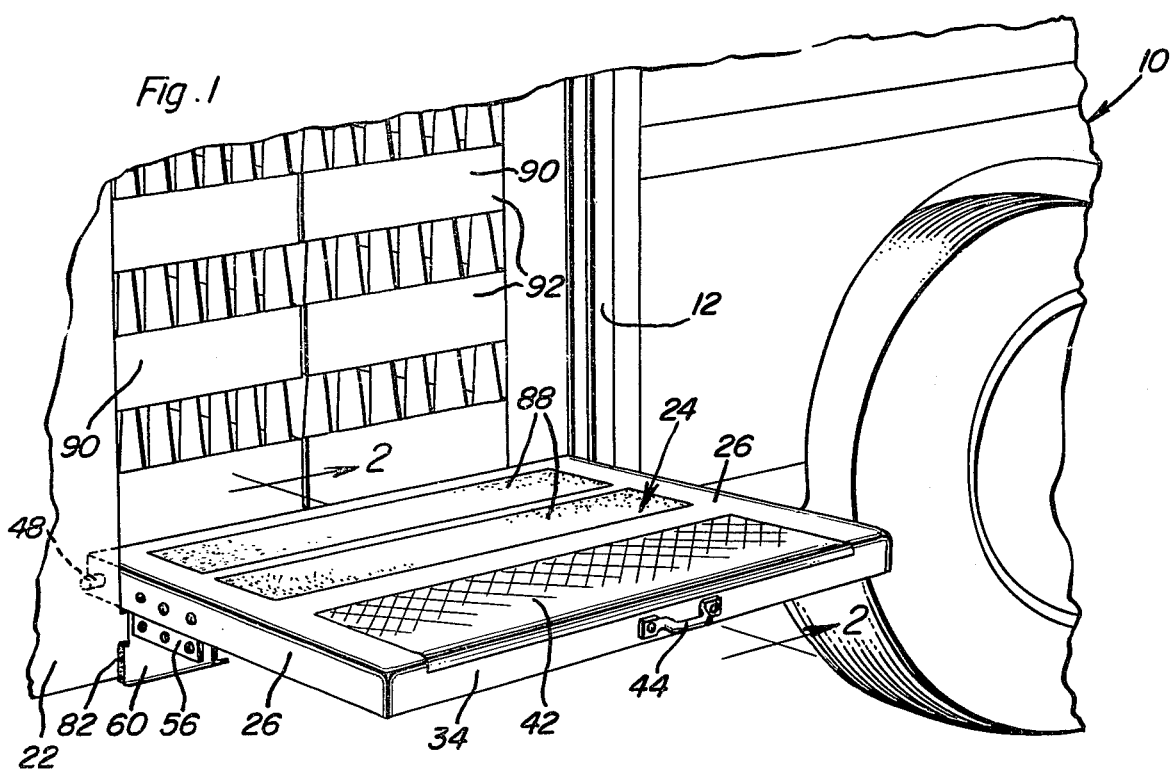
FIG. 1 is a fragmentary, perspective view of a truck body equipped with a bay doorway and with the platform of the instant invention operatively supported at the lower portion of the bay doorway.

Referring now more specifically to the drawings, the numeral 10 generally designates a truck body having a bay doorway 12 formed in one side thereof. The bay doorway is defined between upstanding members 14 and 16 of the body 10 at opposite sides of the doorway 12. The upstanding members 14 and 16 define vertical opposing channels 18 and 20 in which the associated bay door (not shown) is vertically slidable. In addition, the lower extremity of the doorway 12 is defined by a horizontal sill 22 extending between the lower ends of the upstanding members 14 and 16.

The platform of the instant invention is referred to in general by the reference numeral 24 and includes a pair of opposite side angle members 26 including outer vertical flanges 28 and upper horizontal flanges 30.

The inner and outer ends of the angle members 26 are interconnected by means of an inner channel member 32 and an outer channel member 34 extending and secured between the angle members 26 and a third channel member 36 extends between and is is secured to the longitudinal midportions of the angle members 26.

The upper portion of the platform 24 disposed between the side angle members 26 and between the channel members 32 and 36 is closed by means of a horizontal panel 38 extending and secured between the angle members 26. The inner edge of the panel 38 is formed integrally with the upper marginal portion of the inner channel member 32 and the outer marginal edge of the panel 38 includes a downturned flange 40 secured to the inner surface of the channel member 36. The channel members 34 and 36 are formed integrally with an expanded sheet metal section 42 extending and secured between the outer ends of the angle members 26.

The longitudinal midportion of the angle member 34 has a handle 44 mounted on its outer surface centrally intermediate its opposite ends and the opposite ends of the angle member 32 have thick walled sleeves 46 seated and secured in the inner corners thereof. The sleeves 46 have stub axle portions 48 secured therein projecting outwardly through the corresponding side angle member flanges 28 adjacent the inner ends thereof and the inner end portions of the flanges 28 have a first pair of corresponding leaves 50 of piano hinges 52 secured to the inner surface portions thereof by means of rivets 54. The hinges 52 include second leaves 56 hingedly supported from the leaves 50 and the leaves 56 are secured, by rivets 58, to the outer surfaces of dependingly supported braces 60. The braces 60 are disposed inwardly of the leaves 56 and each brace 60 includes a vertical marginal portion 62 defined by a right angled and inturned flange 64 and also a right angled and inturned flange 66 inclined upwardly and outwardly away from the lower end of the corresponding flange 64.

Also, each brace 60 includes an upturned extension or flange 68 extending upwardly from the lower marginal portion of the corresponding flange 66 to which the lower end of an inwardly and upwardly inclined compression locking articulated brace 70 is secured as at 72. The upper ends of the braces 70 are secured to the underside of the panel 38 as at 74 inwardly of the corresponding side marginal portions of the panel 38 secured to the flanges 30 of the angle members 26. The articulated braces 70 include upper and lower sections 76 and 78 pivotally joined together as at 80.

Figure 2:
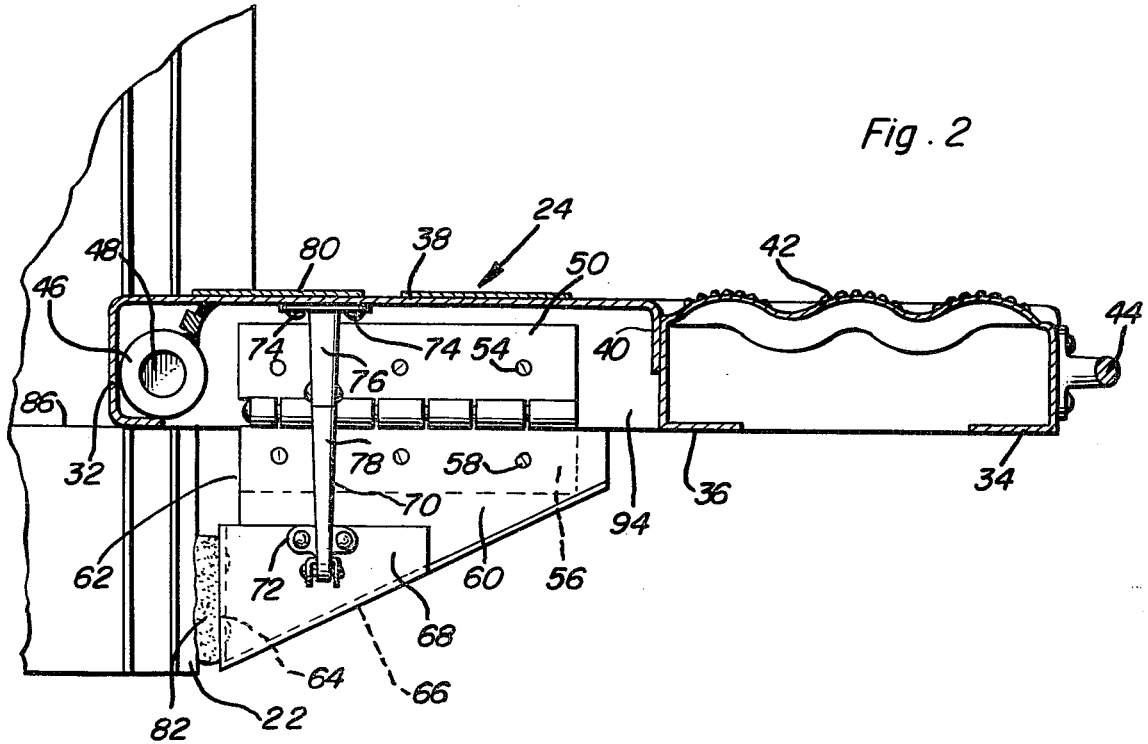
FIG. 2 is an enlarged, fragmentary, vertical sectional view taken substantially upon the plane indicated by the section line 2—2 of FIG. 1.
Figure 3:
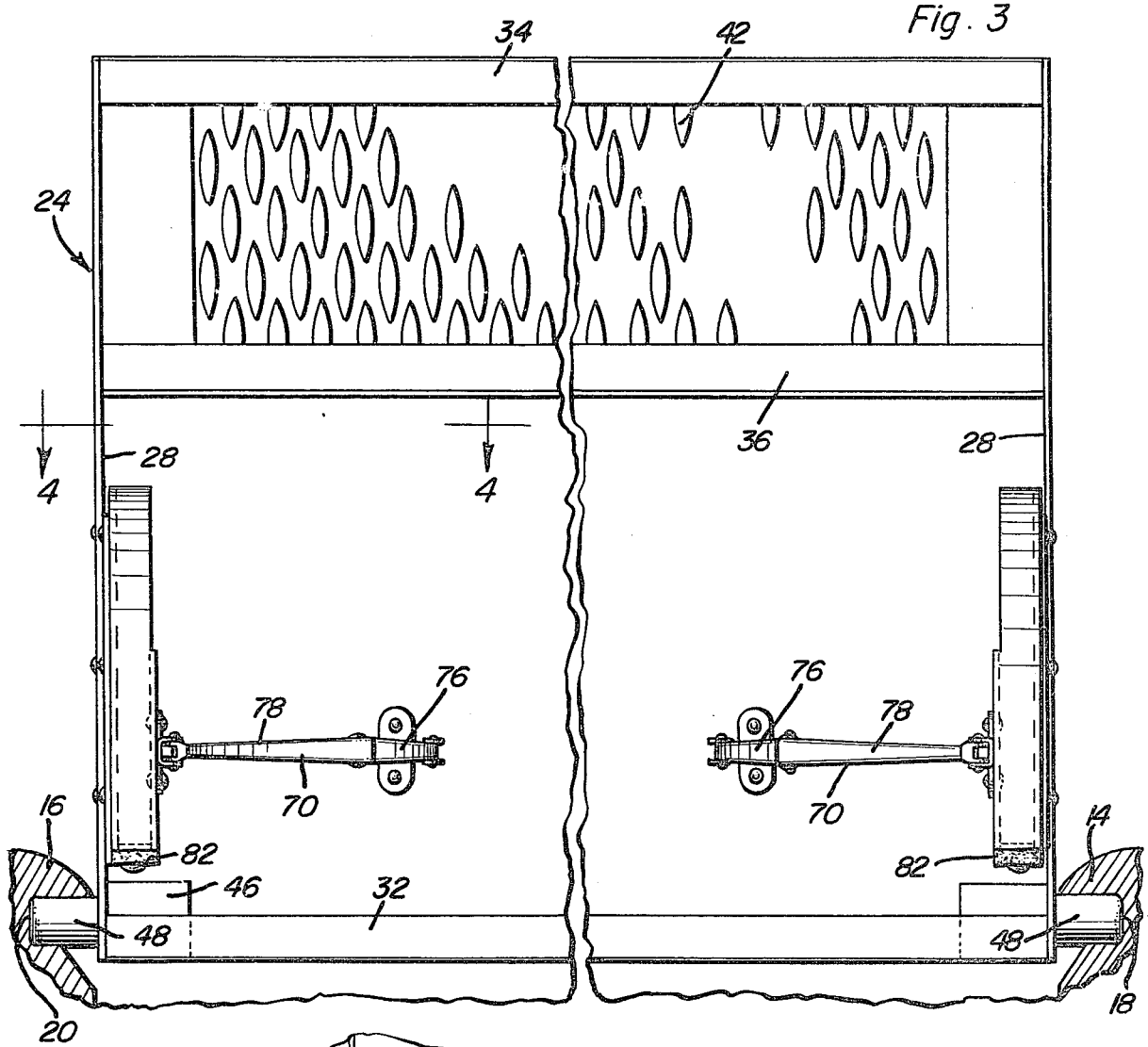
FIG. 3 is a bottom plan view of the platform with portions thereof being broken away and with the platform operatively associated with portions of the truck body boken away and illustrated in horizontal section.

It will also be noted from FIGS. 1, 2 and 3 of the drawings that the flanges 64 include abutment pads 82 supported from the lower ends thereof.

In operation, the platform 24 may be installed in the doorway 12 by inclining the platform 24 with one of the angle members 26 disposed uppermost. Then, the stub axle or shaft portions 48 may be inserted into upper portions of the channels 18 and 20 and the platform 24 may be thereafter pivoted to a horizontal position and slid downwardly along the channels 18 and 20 until the undersurface portions of the platform 24 abut the floor 86 of the body 10. With the platform 24 horizontally disposed, the abutment pads 82 will then be abuttingly engaged with the opposite end portions of the outer surface of the sill 22 and the platform 24 will thus be securely supported from the body 10. The upper surface of the panel 38 has anti-skid strips 88 supported therefrom and the platform 24 may be utilized as a support for a workman desiring to remove upper articles from stacks 90 of articles 92 disposed in the body 10.

Figure 4:
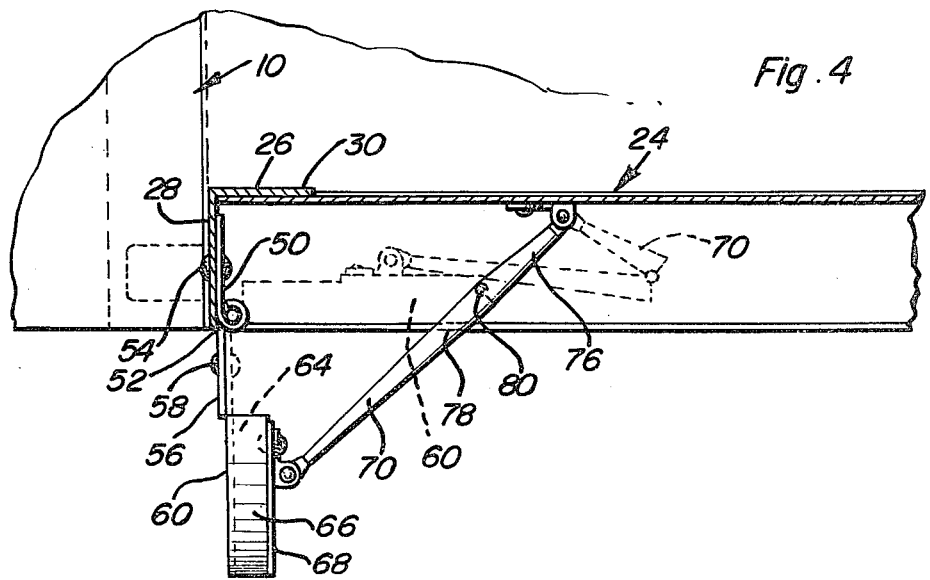
FIG. 4 is a fragmentary, vertical sectional view taken substantially upon the plane indicated by the section line 4—4 of FIG. 3.

When it is desired to shift the platform 24 from one bay door opening to another, it is merely necessary to swing the outer marginal portion of the platform 24 upwardly and to thereafter upwardly incline one side of the platform 24 after which the stub axle portions 48 may be disengaged from the channels 18 and 20 and the platform 24 may be remounted at the lower end of an adjacent doorway 12 of the body 10. When it is desired to store the platform 24 within the body 10, the platform 24 is removed from the doorway in the manner described immediately above and the braces 70 are swung to the collapsed dotted line positions thereof illustrated in FIG. 4 of the drawings, whereby the braces 60 will automatically be swung to the phantom line positions thereof illustrated in FIG. 4 fully received within the downwardly opening recess 94 defined by the platform 24 between the angle members 32 and 36.

The platform 24 may be readily transported by means of the handle 44 and is of lightweight construction. However, the platform 24 includes structural features which enable it to support heavy loads up to 1,000 lbs. and it will be noted that the platform, when mounted relative to the body 10 in the manner illustrated in FIGS. 1, 2 and 3 is supported stationarily relative to the body 10 and thus provides a stable and strong support for workmen to utilize when unloading the body 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A generally horizontal platform for removable support from the side of a truck body having a bay doorway therein and defining opposing upstanding channels extending along opposite sides of said doorway and a lower horizontal sill structure extending between the lower ends of the opposite side marginal portions of said doorway, said platform including a horizontal panel structure defining a pair of opposite side marginal edge portions and a pair of inner and outer marginal edge portions extending between the pairs of corresponding ends of said side marginal edge portions, said platform including oppositely endwise outwardly directed stub shaft portions supported therefrom and projecting outwardly from the ends of said side marginal edge portions adjacent said inner side marginal edge portion, said stub shaft portions being adapted to be slidingly and rotatably received in said channels, said platform further including a pair of braces dependingly supported from said side marginal edge portions and including upstanding abutment surfaces facing outwardly of said inner marginal edge portion, said abutment surfaces being disposed, generally, in an upstanding plane spaced from said inner marginal edge portion toward said outer marginal edge portion and being adapted to abut the outer surfaces of said sill.

2. The combination of claim 1 wherein said dependingly supported braces are pivotally supported from said opposite side marginal edge portions and are swingable inwardly and upwardly toward collapsed positions generally paralleling and closely underlying the underside of said platform.

3. The combination of claim 2 including a pair of inclined articulated compression locking braces secured at their lower ends to lower portions of said depending braces and at their upper ends to underside portions of said platform spaced inwardly of said side marginal edge portions.

4. The combination of claim 1 wherein said inner side marginal edge portion is defined by an angle member extending therealong, the opposite ends of said angle member having aligned thick walled sleeves seated and secured in the inside corners thereof, said stub shaft portions including adjacent ends anchored in said thick walled sleeves.

5. The combination of claim 1 wherein said dependingly supported braces are pivotally supported from said opposite side marginal edge portions and are swingable inwardly and upwardly toward collapsed positions generally paralleling and closely underlying the underside of said platform, said braces being hingedly supported from said side marginal edge portions by means of piano hinges.

6. The combination of claim 5 including a pair of inclined articulated compression locking braces secured at their lower ends to lower portions of said depending braces and at their upper ends to underside portions of said platform spaced inwardly of said side marginal edge portions.

7. The combination of claim 6 wherein said inner side marginal edge portion is defined by an angle member extending therealong, the opposite ends of said angle member having aligned thick walled sleeves seated and secured in the inside corners thereof, said stub shaft portions including adjacent ends anchored in said thick walled sleeves.